United States Patent
Kondo

(10) Patent No.: US 7,932,456 B2
(45) Date of Patent: Apr. 26, 2011

(54) MUSIC REPLAY CIRCUIT

(75) Inventor: Kazuhiko Kondo, Ogaki (JP)

(73) Assignees: Sanyo Electric Co., Ltd. (JP); Sanyo Semiconductor Co., Ltd. (JP)

( * ) Notice: Subject to any disclaimer, the term of this patent is extended or adjusted under 35 U.S.C. 154(b) by 152 days.

(21) Appl. No.: 12/240,602

(22) Filed: Sep. 29, 2008

(65) Prior Publication Data

US 2009/0139388 A1 Jun. 4, 2009

(30) Foreign Application Priority Data

Sep. 27, 2007 (JP) ................................. 2007-252208

(51) Int. Cl.
*G10H 7/00* (2006.01)

(52) U.S. Cl. ......................................... 84/602; 700/94
(58) Field of Classification Search .................... 84/602, 84/624; 700/94
See application file for complete search history.

(56) References Cited

U.S. PATENT DOCUMENTS

| 6,553,073 | B1 * | 4/2003 | Ogata | 375/240.28 |
| 2006/0288851 | A1 * | 12/2006 | Kawamura et al. | 84/624 |
| 2007/0083362 | A1 * | 4/2007 | Moriya et al. | 704/219 |
| 2007/0216546 | A1 * | 9/2007 | Iwasaki et al. | 341/50 |

FOREIGN PATENT DOCUMENTS

JP 3820331 B2 6/2006

* cited by examiner

*Primary Examiner* — Jianchun Qin
(74) *Attorney, Agent, or Firm* — Cantor Colburn LLP

(57) ABSTRACT

A music replay circuit is provided which includes a header analyzing unit which analyzes a header included in each of a plurality of frames in a data stream which are compressed music data and extracts bitrate information included in the header, a decoder which decodes the data stream analyzed by the header analyzing unit, a high-frequency correction unit which generates data in which high-frequency music data is interpolated, for music data decoded by the decoder, and a process setting unit which controls the process applied by the high-frequency correction unit based on the bitrate information extracted by the header analyzing unit, wherein the process setting unit control the process by the high-frequency correction unit according to the bitrate information extracted for each frame.

3 Claims, 4 Drawing Sheets

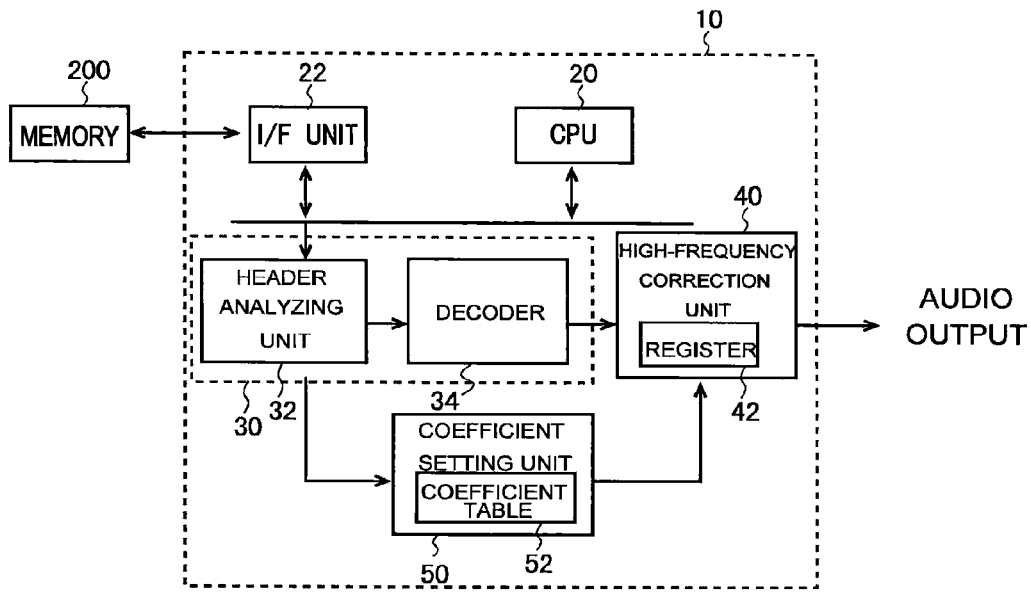
FIG. 1
FIG. 2
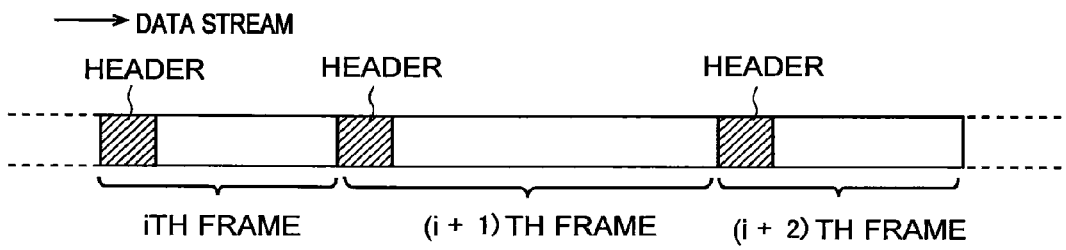
FIG. 3

MUSIC REPLAY CIRCUIT

CROSS-REFERENCE TO RELATED APPLICATION

The disclosure of Japanese Patent Application No. 2007-252208 filed on Sep. 27, 2007 including specification, claims, drawings, and abstract is incorporated herein by reference in its entirety.

BACKGROUND OF THE INVENTION

1. Field of the Invention

The present invention relates to a music replay circuit which decodes music data which is compressed by a predetermined encoding method and replays the decoded music data.

2. Description of the Related Art

Recently, music replay devices are widely in use which replay music data which is compressed by an encoding method such as MP3 or AAC. The compressed music data as described above realizes compression of data by reducing an amount of data for a high-frequency portion for which the sensitivity of the hearing of humans is low, and applying a discrete cosine transform process to the data having the amount of data reduced. Because a sufficient amount of music data can be stored in a memory having a low capacity by compressing the music data, such a technique allows creation of a music replay device having a reduced cost and a reduced size.

As described, because data of the high-frequency portion is removed in the compressed music data, the sound quality is reduced compared to the music data before compression. FIG. 4A shows a frequency characteristic of the compressed music data. Music data which is sampled at a frequency of 44.1 kHz is data which includes frequency components with the upper limit at 22 kHz. However, because the data of the high-frequency portion is removed in the compressed music data, the data is, in the example configuration of FIG. 4A, data including frequency components with the upper limit at approximately 13 kHz. As a technique for interpolating the data of the removed high-frequency portion when the compressed music data is replayed, there is known an invention described in Japanese Patent No. 3820331.

Japanese Patent No. 3820331 discloses in FIG. 1 a music data signal decoding system comprising a sampler 3, an upsampler 5, and a digital filter 6. For the music data to be replayed, the sampler 3 applies a downsampling process, and then, the upsampler 5 applies an upsampling process. In other words, the upsampler 5 inserts a zero signal to the data portion removed by the sampler 3. The digital filter 6 applies a filter process to the music data in which the zero signal is inserted at a predetermined period, so that the inserted zero signal is corrected to a suitable value and music data in which the data of the high-frequency portion is interpolated and leveled is generated.

FIG. 8 is a block diagram of a music replay circuit 100 of related art having a function to interpolate the data of the high-frequency portion. The music replay circuit 100 comprises a CPU 120, an interface (I/F) unit 122, a decoder 130, and a high-frequency correction unit 140, and is connected to a memory 200 in which the compressed music data is stored.

The CPU 120 is connected to various signal processors included in the music replay circuit 100 through a bus, and controls operations of various signal processors such as the I/F unit 122, decoder 130, and high-frequency correction unit 140. The CPU 120 controls operations of various signal processors according to a control program stored in the memory 200 or another memory which is not shown.

The I/F unit 122 reads music data stored in the memory 200 and transfers the music data to the decoder 130. The I/F unit 122 also executes reading and writing processes of various data including the music data between the music replay circuit 100 and the memory 200, according to an instruction by the CPU 120.

The decoder 130 applies a decoding process to the compressed music data which is read from the memory 200, and generates music data. The decoder 130 applies a decoding process according to an encoding method such as MP3 and AAC.

The high-frequency correction unit 140 is a circuit which applies an interpolation process of the data of the high-frequency portion on the decoded music data, and corresponds to the signal decoding system described in Japanese Patent No. 3820331. The high-frequency correction unit 140 applies a downsampling process, an upsampling process, and a filter process on the decoded music data, to generate music data in which the high-frequency portion is interpolated. The high-frequency correction unit 140 comprises a register 142 which stores a filter coefficient for executing the filter process, and a filter coefficient is stored by a control of the CPU 120.

The music data stored in the memory 200 includes a data stream having a plurality of frames. Each frame of the data stream has a header portion provided at the front portion of the frame and a user data portion following the header portion. For example, when music data which is sampled at the frequency of 44.1 kHz is compressed by the encoding method of MP3, a compression process is executed with data of 1152 consecutive samples as one frame. When the compression rate is constant, that is, for the case of the compressed music data of a fixed bit rate, all frames in the data stream have the same bit number, and information indicating a constant data length is attached in the header to be attached to each frame.

The CPU 120 determines a coefficient of the filter included in the high-frequency correction unit 140 based on the information of the bit rate, and sets the filter coefficient in the register 142. In the case of the fixed bit rate, the high-frequency correction unit 140 executes the high-frequency correction process using the same filter coefficient.

Although compressed music data has an advantage that the data capacity is low, because the music data of the high-frequency portion is removed, the compressed music data always suffers a problem of degradation in sound quality. As a method for improving this, there is known an encoding process of a variable bit rate method in which the compression rate is changed for each frame in the data stream. In other words, according to a characteristic of each frame, a bit rate which can achieve a high sound quality and a high compression rate is selected, and the encoding process is executed.

When compressed music data of a variable bit rate is to be replayed with the music replay circuit 100 of related art, the high-frequency correction unit 140 applies the high-frequency correction process using the same filter coefficient to the frames having different compression rates. In this process, in the replayed music, the optimum correction process may not be performed even though the high-frequency correction process is applied.

As the bit rate of the frame is reduced, the amount of music data of the high-frequency portion to be removed is increased. Therefore, the optimum filter coefficient used in the high-frequency correction process differs according to the bit rate of each frame. More specifically, when the high-frequency correction process is applied using a certain constant filter coefficient when the compressed music data of a variable bit rate is to be replayed, the filter coefficient may be an optimum filter coefficient for a frame having a high bit rate, but not an optimum filter coefficient for a frame having a low bit rate. In this case, although the high-frequency correction process is applied, an optimum high-frequency correction process is not applied to the frames having low bit rates, and the performance of sound quality improvement by the high-frequency correction process cannot be sufficiently realized.

SUMMARY OF THE INVENTION

According to one aspect of the present invention, there is provided a music replay circuit comprising a header analyzing unit which analyzes a header included in each of a plurality of frames in a data stream which are compressed music data, and extracts bitrate information included in the header, a decoder which decodes the data stream analyzed by the header analyzing unit, a high-frequency correction unit which generates data in which high-frequency music data is interpolated, for music data decoded by the decoder, and a process setting unit which controls a process applied by the high-frequency correction unit, based on the bitrate information extracted by the header analyzing unit, wherein the process setting unit controls the process by the high-frequency correction unit according to the bitrate information extracted for each frame.

BRIEF DESCRIPTION OF THE DRAWINGS

Exemplary embodiments of the present invention will be described in detail based on the following figures, wherein:

FIG. 1 is a schematic block diagram of a music replay circuit of a preferred embodiment of the present invention;

FIG. 2 is a diagram schematically showing a coefficient table 52 in a preferred embodiment of the present invention;

FIG. 3 is a diagram showing a data stream and a frame of compressed music data which is encoded with a variable bit rate;

DESCRIPTION OF THE PREFERRED EMBODIMENT

Figure 4A:
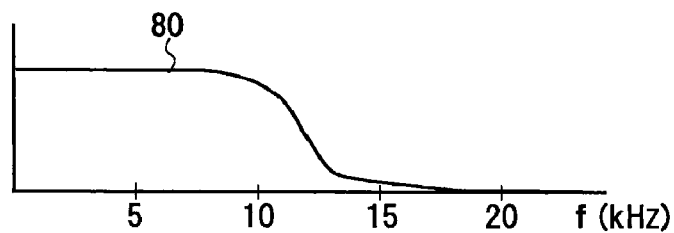
FIGS. 4A and 4B are diagrams showing frequency characteristics of compressed music data and music data to which a high-frequency correction process is applied.

FIG. 1 is a block diagram of a music replay circuit 10 of a preferred embodiment of the present invention. The music replay circuit 10 comprises a CPU 20, an I/F unit 22, a decoder 30, a high-frequency correction unit 40, and a coefficient setting unit 50, and is connected to a memory 200 in which compressed music data is stored.

The CPU 20 is connected to various signal processors included in the music replay circuit 10 through a bus, and controls operations of the various signal processors such as the I/F unit 22, decoder 30, high-frequency correction unit 40, and coefficient setting unit 50. The CPU 20 controls operations of various signal processors according to a control program stored in the memory 200 or another memory which is not shown.

The I/F unit 22 reads music data stored in the memory 200 and transfers the music data to the decoder 30. The I/F unit 22 also executes reading and writing processes of various data including the music data between the music replay circuit 10 and the memory 200, according to an instruction from the CPU 20.

The decoder 30 comprises a header analyzing unit 32 and a decoder 34. The header analyzing unit 32 analyzes information of a header portion included in a data stream of the compressed music data. The header portion includes information indicating a data length of the frame in which the header is included, and the header analyzing unit 32 extracts the information of the data length of the frame and outputs the information to the coefficient setting unit 50. The decoder 34 applies a decoding process according to the format of the compressed music data on a user data portion included in the data stream of the compressed music data.

The high-frequency correction unit 40 is a circuit which applies an interpolation process of data of a high-frequency portion on the decoded music data, and corresponds to the signal decoding system of Japanese Patent No. 3820331. The high-frequency correction unit 40 applies a downsampling process, an upsampling process, and a filter process on the decoded music data, to generate music data in which the high-frequency portion is interpolated. The high-frequency correction unit 40 comprises a register 42 which stores a filter coefficient for executing the filter process, and a filter coefficient is stored under control of the coefficient setting unit 50.

The coefficient setting unit 50 comprises a coefficient table 52, and stores the filter coefficient stored in the coefficient table 52 in the register 42. As shown in FIG. 2, the coefficient table 52 stores filter coefficients corresponding to information of a plurality of data lengths, respectively. For example, coefficients A, B, C, D, and E are correlated to bit rates of 64 kbps, 80 kbps, 96 kbps, 128 kbps, and 192 kbps. The coefficient setting unit 50 refers to the coefficient table 52 based on the information of the data length which is output from the header analyzing unit 32, and sets the filter coefficient in the register 42.

The memory 200 stores compressed music data to be processed by the music replay circuit 10. The memory 200 may be, for example, a memory chip such as a flash memory or a hard disk drive which is provided in the music replay device in which the music replay circuit 10 is equipped or a memory card which is detachable from the music replay device. The memory 200 may have a structure to store a control program for controlling the music replay circuit, in addition to the compressed music data.

Next, an operation of replaying compressed music data of a variable bit rate will be described with reference to FIGS. 1 and 3. FIG. 3 shows a structure of a data stream of compressed music data encoded with a variable bit rate. In the data stream, the header portion and the user data portion appear alternately, and FIG. 3 shows the header portion and the user data portions of the ith frame to the (i+2)th frame.

In the case of the compressed music data of a variable bit rate, as shown in FIG. 3, although the data length of the header portion is equal among the frames, the data length of the user data portion differs. For example, the (i+1)th frame has a longer data length, that is, a higher bit rate, compared to the ith frame and the (i+2)th frame. The header portion includes information of the data length based on the difference in the data length of the user data, and the header analyzing unit 32 extracts the information of the data length and outputs the information to the coefficient setting unit 50.

The decoder 34 decodes a data stream which is output from the header analyzing unit 32, and outputs the decoded result to the high-frequency correction unit 40. The coefficient setting unit 50 in this process stores, in the register 42 and in synchronization with the timing when the data of the frame decoded by the decoder 34 is output to the high-frequency correction unit 40, the filter coefficient corresponding to the information of the data length which is extracted from the frame. With this process, a suitable filter coefficient can be set according to the information of the data length, that is, the bit rate, of the frame to which the high-frequency correction process is applied.

The structure of the high-frequency correction unit 40 will now be described in detail with reference to FIGS. 4A, 4B, and 5. A characteristic of the example configuration of FIGS. 4A, 4B, and 5 is that the music data to which the high-frequency correction process is applied is output without a further process.

FIG. 4A shows a frequency characteristic of data before the high-frequency correction process is applied, for music data included in a frame of a predetermined bit rate. A frequency characteristic 80 shown in FIG. 4A has a characteristic with an upper limit of approximately 13 kHz. When the high-frequency correction process is applied on this data, the data of the high-frequency region is interpolated, and a frequency characteristic 82 having the upper limit at approximately 20 kHz as shown in FIG. 4B can be obtained.

Figure 4B:
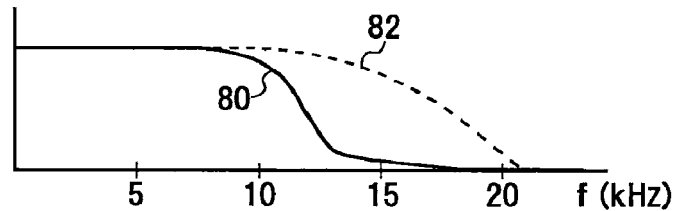
Figure 5:
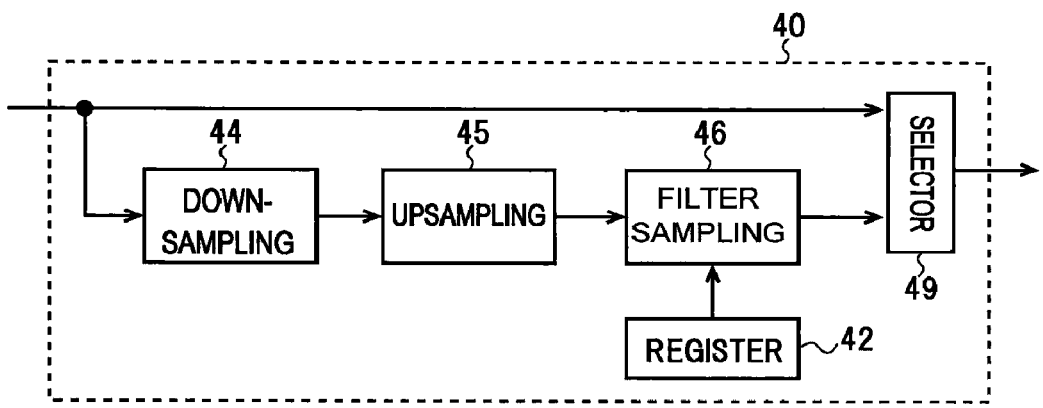
FIG. 5 is a schematic block diagram of a high-frequency correction unit 40 of a preferred embodiment of the present invention.

FIG. 5 is a block diagram of the high-frequency correction unit 40 which allows the frequency characteristic 82 as shown in FIGS. 4A and 4B to be obtained. The high-frequency correction unit 40 comprises a register 42, a downsampling unit 44, an upsampling unit 45, a filter processor 46, and a selector 49.

The downsampling unit 44 applies a downsampling process on the music data to be replayed, and the upsampling unit 45 applies an upsampling process on the music data which is downsampled. In other words, the upsampling unit 45 inserts a zero signal into the data portion removed by the downsampling unit 44.

The filter processor 46 applies the filter process on the music data in which the zero signal is inserted at a predetermined period, based on a filter coefficient stored in the register 42. With this process, the filter processor 46 corrects the inserted zero signal to a suitable value, and outputs music data in which the data of the high-frequency portion is interpolated and leveled.

The selector 49 selectively outputs the music data before the high-frequency correction process is applied or the music data which is output from the filter processor 46. When the high-frequency correction process is to be executed, the selector 49 selects the music data which is output from the filter processor 46, and outputs the selected music data.

Next, the structure of the high-frequency correction unit 40 will be described in detail with reference to FIGS. 6A, 6B, 6C and 7. A characteristic of the example configuration of FIGS. 6A, 6B, 6C, and 7 is that only the high-frequency portion of the music data to which the high-frequency correction process is applied is extracted and added to the music data before the high-frequency correction, and the corrected data is output.

Figure 6A:
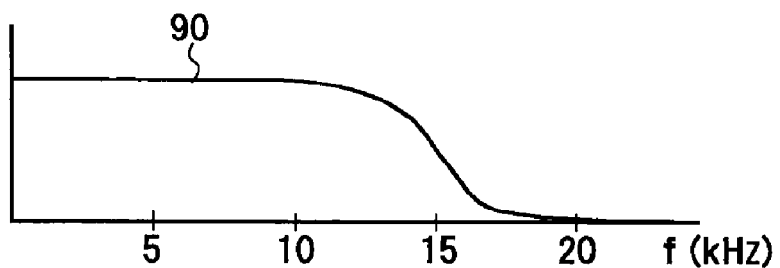
FIGS. 6A, 6B, and 6C are diagrams showing frequency characteristics of compressed music data and music data to which a high-frequency correction process is applied.

FIG. 6A shows a frequency characteristic of data before the high-frequency correction process is applied, for music data included in a frame of a predetermined bit rate. A frequency characteristic 90 shown in FIG. 6A has a characteristic with an upper limit of approximately 15 kHz. When the high-frequency correction process is applied to the data, the data of the high-frequency region is interpolated, and a frequency characteristic 92 having the upper limit at approximately 20 kHz as shown in FIG. 6B is obtained.

Figure 6B:
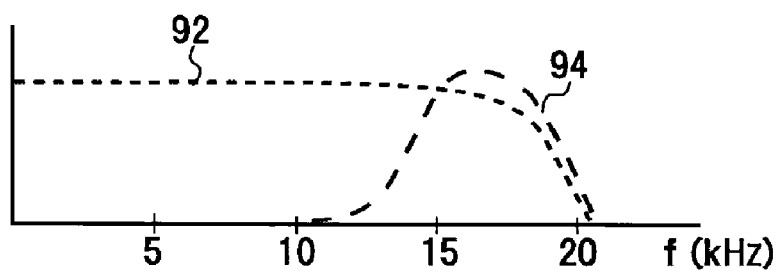
Figure 6C:
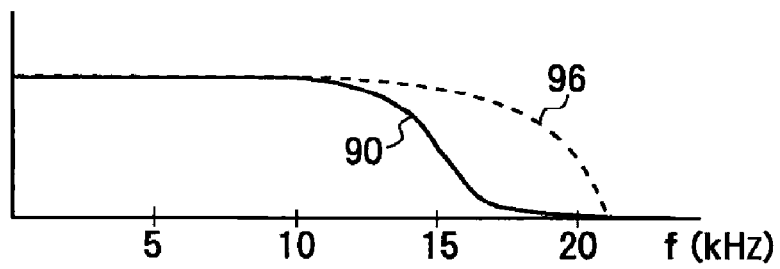

In the example configuration of FIGS. 6A, 6B, and 6C, in order to extract only the data of the high-frequency portion from the frequency characteristic 92, the frequency characteristic 92 is multiplied by a gain 94 for extracting data from around 13 kHz to around 20 kHz. By adding the interpolation data of the high-frequency portion shown in FIG. 6B to the frequency characteristic 90, it is possible to obtain a frequency characteristic 96 in which the high-frequency portion is interpolated and the upper limit is approximately 20 kHz as shown in FIG. 6C.

Figure 7:
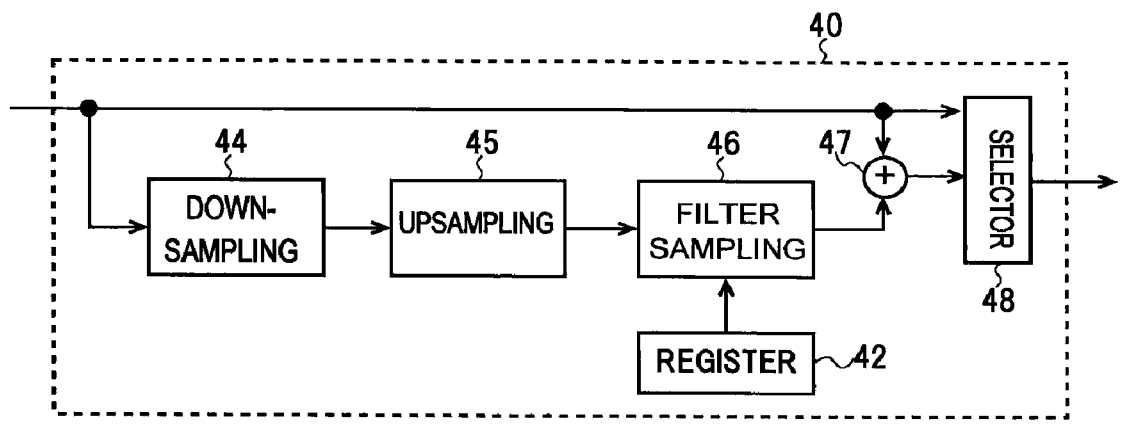
FIG. 7 is a schematic block diagram of a high-frequency correction unit 40 of a preferred embodiment of the present invention.
Figure 8:
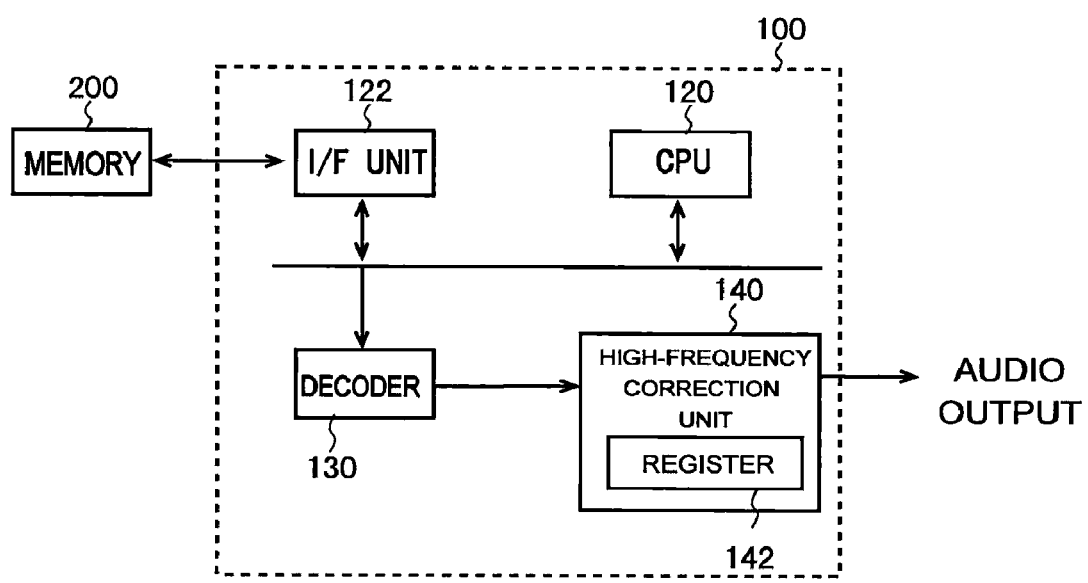
FIG. 8 is a schematic block diagram of a music replay circuit of related art.

FIG. 7 is a block diagram of the high-frequency correction unit 40 which allows the frequency characteristic 96 of FIGS. 6A, 6B, and 6C to be obtained. The high-frequency correction unit 40 comprises the register 42, the downsampling unit 44, the upsampling unit 45, the filter processor 46, an adder 47, and a selector 48.

The downsampling unit 44 applies a downsampling process to the music data to be replayed, and the upsampling unit 45 applies an upsampling process to the downsampled music data. In other words, the upsampling unit 45 inserts a zero signal into a data portion removed by the downsampling unit 44.

The filter processor 46 applies a filter process to the music data in which the zero signal is inserted at a predetermined period, based on the filter coefficient stored in the register 42. With this process, the filter processor 46 corrects the inserted zero signal to a suitable value, and extracts and outputs the data of the high-frequency portion of the music data in which the data of the high-frequency portion is interpolated and leveled.

The adder 47 adds the music data before the high-frequency correction process is applied and the interpolation data of the high-frequency portion which is output from the filter processor 46, to generate the music data in which the high-frequency portion is interpolated. The selector 48 selectively outputs the music data before the high-frequency correction process is applied or the music data which is output from the adder 47. When the high-frequency correction process is executed, the selector 48 selects the music data which is output from the adder 47 and outputs the selected data. In this process, the music data before the high-frequency correction process is applied, which is input to the adder 47, is preferably delayed by a predetermined time by a delay circuit which is not shown. With this process, it is possible for the adder 47 to add the music data before the high-frequency correction process is applied and the interpolation data of the high-frequency portion at a synchronous timing.

It is desirable that the high-frequency correction unit 40 shown in FIG. 5 is used when the upper limit of the frequency characteristic of the compressed music data to be replayed is relatively low. In other words, because the amount of data of the high-frequency portion is small in the original compressed music data, the possibility of interference with the interpolated music data of the high-frequency portion is low. Because of this, the high-frequency correction unit 40 can output, without further processing, the music data to which the high-frequency correction process is applied, to output music data of high sound quality.

It is desirable that the high-frequency correction unit 40 shown in FIG. 7 is used in the case when the upper limit of the frequency characteristic of the compressed music data to be replayed is relatively high. In other words, because the amount of data of the high-frequency portion is relatively large in the original compressed music data, the possibility of interference with the interpolated music data of the high-frequency portion is high. The high-frequency correction unit 40 can remove the data of the high-frequency portion which may interfere and add the data to the music data before the high-frequency correction process is applied, to output music data of high sound quality.

In the preferred embodiment of the present invention, a coefficient setting unit 50 which updates the filter coefficient of the digital filter in the high-frequency correction unit 40 according to the bitrate information extracted for each frame is provided. With such a configuration, even when the music data of variable bit rate is to be replayed, a high-frequency correction process can be executed according to the data amount, that is, the frequency characteristic, of each frame in the data stream, and, thus music data of high sound quality can be output.

The music replay device 10 of the embodiment of the present invention can control the frequency characteristic level of the interpolated music data of the high-frequency portion according to each frame included in the music data of variable bit rate. The control of the frequency characteristic level of the interpolated data can be realized by changing the filter coefficient stored in the register 42. In the data stream shown in FIG. 3, the (i+1)th frame has a higher bit rate compared to the ith frame. In this configuration, the coefficient setting unit 50 controls the filter coefficient so that the frequency characteristic level of the high-frequency portion of the (i+1)th frame is lower compared to the ith frame. With this process, it is possible to output music data of high sound quality even when the music data of variable bit rate is replayed.

The header analyzing unit 32 and the coefficient setting unit 50 of the preferred embodiment of the present invention can also be realized by the CPU. In this case, in order to synchronize the timing when the decoder 34 outputs the decoded frame data and the timing when the filter coefficient is stored in the register 42, it is necessary to assign a higher priority of task to the storage of the filter coefficient in the CPU. In this configuration, although the load of the CPU increases, no circuit needs to be added. In the preferred embodiment of the present invention shown in FIG. 1, on the other hand, the header analyzing unit 32 and the coefficient setting unit 50 are constructed with circuits independent from the CPU 20. With such a configuration, it is possible to synchronize the timing when the decoder 34 outputs the decoded frame data and the timing when the filter coefficient is stored in the register 42, without increasing the load of the CPU.

In the preferred embodiment of the present invention, a structure is described in which the filter coefficient stored in the register 42 in the high-frequency correction unit 40 is changed according to the information of the data length of each frame in the data stream, but the present invention is not limited to such a configuration. For example, a structure may be employed in which whether or not the high-frequency correction process is applied is selected according to the information of the data length of each frame. In this configuration, the coefficient setting unit 50 switches selectors 49 and 48 according to the information of the data length of each frame.

When the bit rate is high, the upper limit of the frequency characteristic of the music data included in the frame is relatively high, and thus music data of high sound quality can be obtained without applying the high-frequency correction process. On the other hand, when the bit rate is low, the upper limit of the frequency characteristic of the music data included in the frame is relatively low, and music data of high sound quality can be obtained by applying the high-frequency correction process. By switching these processes for each frame, it is possible to output music data of high sound quality when the compressed music data of variable bit rate is replayed. Moreover, in the present invention, the control to apply or not apply the high-frequency correction process and the control to change the filter coefficient can be simultaneously executed.

What is claimed is:

1. A music replay circuit comprising:
    a header analyzing unit which analyzes a header included in each of a plurality of frames in a data stream which are compressed music data, and extracts bitrate information included in the header;
    a decoder which decodes the data stream analyzed by the header analyzing unit;
    a high-frequency correction unit which generates data in which high-frequency music data is interpolated, for music data decoded by the decoder; and
    a process setting unit which controls a process applied by the high-frequency correction unit, based on the bitrate information extracted by the header analyzing unit,
    wherein
    the process setting unit controls the process by the high-frequency correction unit according to the bitrate information extracted for each frame;
    the process setting unit switches, based on the bitrate information, whether or not the process by the high-frequency correction unit is executed; and
    the process setting unit switches whether or not the process by the high-frequency correction unit is executed in synchronization with a timing when the decoder decodes and outputs a frame from which the header is extracted.

2. A music replay circuit comprising:
    a header analyzing unit which analyzes a header included in each of a plurality of frames in a data stream which are compressed music data and extracts bitrate information included in the header;
    a decoder which decodes the data stream analyzed by the header analyzing unit;
    a high-frequency correction unit which generates data in which high-frequency music data is interpolated by applying a filter process to music data decoded by the decoder; and
    a process setting unit which sets a filter coefficient of a filter process applied by the high-frequency correction unit, based on the bitrate information extracted by the header analyzing unit, wherein
    the process setting unit updates the filter coefficient according to the bitrate information extracted for each frame,
    wherein the process setting unit comprises a coefficient table which stores the filter coefficient corresponding to each of a plurality of the bitrate information, and the process setting unit sets the filter coefficient of the high-frequency correction unit according to the filter coefficient stored in the coefficient table.

3. The music replay circuit according to claim 2, wherein the process setting unit sets the filter coefficient of the high-frequency correction unit in synchronization with a timing when the decoder decodes and outputs a frame from which the header is extracted.

* * * * *